United States Patent
Kamel et al.

[19]

[11] Patent Number: 5,978,716
[45] Date of Patent: Nov. 2, 1999

[54] SATELLITE IMAGING CONTROL SYSTEM FOR NON-REPEATABLE ERROR

[75] Inventors: Ahmed Kamel, Los Altos; Sun Hur-Diaz, Sunnyvale; Thomas Joseph Holmes, Portola Valley; Donald W. Gamble, Menlo Park, all of Calif.

[73] Assignee: Space Systems/Loral, Inc., Palo Alto, Calif.

[21] Appl. No.: 08/864,263

[22] Filed: May 28, 1997

[51] Int. Cl.⁶ .................................................... G06F 17/00
[52] U.S. Cl. ...................... 701/13; 701/213; 342/357.01; 342/357.06; 342/357.12; 455/12.1
[58] Field of Search .................... 701/13, 213; 455/12.1, 455/13.1, 13.2, 3.2; 342/347, 352, 357, 358, 357.01, 357.06, 357.12, 357.03, 355

[56] References Cited

U.S. PATENT DOCUMENTS

| | | | |
|---|---|---|---|
| 4,688,091 | 8/1987 | Kamel et al. | 348/147 |
| 4,688,092 | 8/1987 | Kamel et al. | 348/147 |
| 4,746,976 | 5/1988 | Kamel et al. | 358/103 |
| 5,749,545 | 5/1998 | Gnatjuk | 244/164 |
| 5,785,279 | 7/1998 | Gregory | 244/158 R |

FOREIGN PATENT DOCUMENTS

| | | |
|---|---|---|
| 0 731 523 | 9/1996 | European Pat. Off. . |
| WO 97/27456 | 7/1997 | WIPO . |

OTHER PUBLICATIONS

"Image navigation improvement using star trackers" by S.H. Diaz and A. Kamen SPIE vol. 2812pp. 836–846 No. XP–002082797.

Patent Abstract of Japan No. 04237038, pub. Date Aug. 25, 1992.

*Primary Examiner*—William A. Cuchlinski, Jr.
*Assistant Examiner*—Gertrude Arthur
*Attorney, Agent, or Firm*—Perman & Green, LLP

[57] ABSTRACT

An onboard star tracking system is used to provide continuous attitude and orbital position data independent of the image generating instruments. Such data is instantaneously and continually supplied to the onboard computer which translates such information into mirror position coordinates which is added to the mirror position set based on estimated data from the ground control. An error signal is generated which is used to further adjust the position of the mirror.

2 Claims, 3 Drawing Sheets

SATELLITE IMAGING CONTROL SYSTEM FOR NON-REPEATABLE ERROR

BACKGROUND OF THE INVENTION

The invention of this application involves an imaging system which is based on an orbiting satellite, the quality of the image depends on the systems ability to point to the target and the stability of the satellite platform during the image generation process. The image consists of a swath across the target and must be assembled as a mosaic by the image processing software. The optical system onboard the satellite consists of a camera and associated mirrors through which the image is received. The imaging instrument is adjusted by altering the position of the mirrors and by controlling the attitude of the space craft. The mirrors are gimbal mounted to provide a two axis adjustment relative to the target which may be defined by longitude and latitude if the target is on earth. The pointing function requires position and attitude data which are, in prior art systems, provided through the use of precision star and earth sensors. A great deal of effort has been invested to maintain the positional stability of the satellite platform resulting in increased complexity in the associated attitude control system.

In general, space craft attitude is adjusted by activating actuators, such as, momentum wheels, magnetic torquers, or thrusters in response to an attitude correction signal. The attitude error is sensed by reference to sensors monitoring the position of the sun, stars and earth relative to the satellite. The attitude is adjusted to its mission orientation in which the imaging system is pointed at its predetermined target and is maintained in this orientation during orbital flight. During flight the satellite is subject to motions induced by external forces, on board mechanisms or other sources and the attitude control system must continuously monitor and adjust attitude.

In addition the line of sight of the imaging instrument must be maintained in registration with the target image. This is accomplished by movement of the mirror on its gimbal mounting. This adjustment is generally a finer adjustment and is less jarring to the space craft than actuator activation. The adjustment is accomplished by actuating servo motors in appropriate increments. A system of controlling the mirror position relative to the target is described in U.S. Pat. Nos. 4,688,091 and 4,688,092. The system described is an earth based system which periodically transmits attitude and orbit position data to the satellite from which the onboard control computer calculates positional errors and translates such errors into mirror position corrective adjustments. The position data is based on star and landmark data obtained from the imaging instrument and transmitted to earth. This data is updated periodically, every 24 hours, and used in attitude and orbit models to estimate attitude and orbital position from which the error calculations are made by the onboard computer.

Although the system of the above referenced patents provide an accurate control of image registration, it has been found that further errors occur because of non-repeatable perturbations which cannot be predicted by the models. The models are based on repetitive attitude disturbances, such as solar stresses, which occur as the position of the sun changes, the models do not respond to random disturbances such as cloud motion, thermal snapping and others. One solution is to update the model more frequently for example 5 or 6 times daily, but the frequency is limited by the availability of data from the image system. Since the mirrors must be slewed to obtain star data during intervals when the imaging process is dormant, there are inherent delays in obtaining the data.

The errors that accumulate have been calculated to be in the range of 50 arc seconds in a day which translates to approximately 10 kilometers on the surface of the earth. It is desirable to limit such errors to below 5 arc seconds in a day. It is the purpose of this invention to provide a supplemental error correction system which fine tunes the mirror position to compensate for errors caused by non-repeatable disturbances.

SUMMARY OF THE INVENTION

A primary image registration system is provided by a ground based control computer which processes data received from a satellite based imaging system. The ground control computer applies the data received to attitude and orbit position models which estimate current position and transmits coordinates of such data to an onboard control computer. The onboard computer compares the estimated position to preset data, and generates a position error. The position error is translated into mirror adjustment signals to reposition the mirror.

An onboard star tracking system is used to provide continuous attitude position data independent of the image generating instruments. Such data is instantaneously and continually supplied to the onboard computer which translates such information into mirror position coordinates which are added to the mirror position set based on estimated data from the ground control. An error signal is generated which is used to adjust the position of the mirror. Since this data is available instantaneously, it does not require complex modeling algorithms and can be used to compensate for the non-repeatable errors.

DESCRIPTION OF THE DRAWINGS

The invention of this application is described in more detail below with reference to the drawings in which.

DESCRIPTION OF THE PREFERRED EMBODIMENT

This invention involves a control system for a space craft the primary mission of which is to provide a platform for the collection of images from earth or other celestial body. More particularly it is related to the control of the imaging instruments to register and maintain the line of sight of the system with the target.

Image registration is the process of limiting the error in the angular separation of repeated images of the same selected imaging area to within a predetermined limit. The images are taken by one or more cameras 7, 8 onboard a spacecraft 10.

Figure 3:
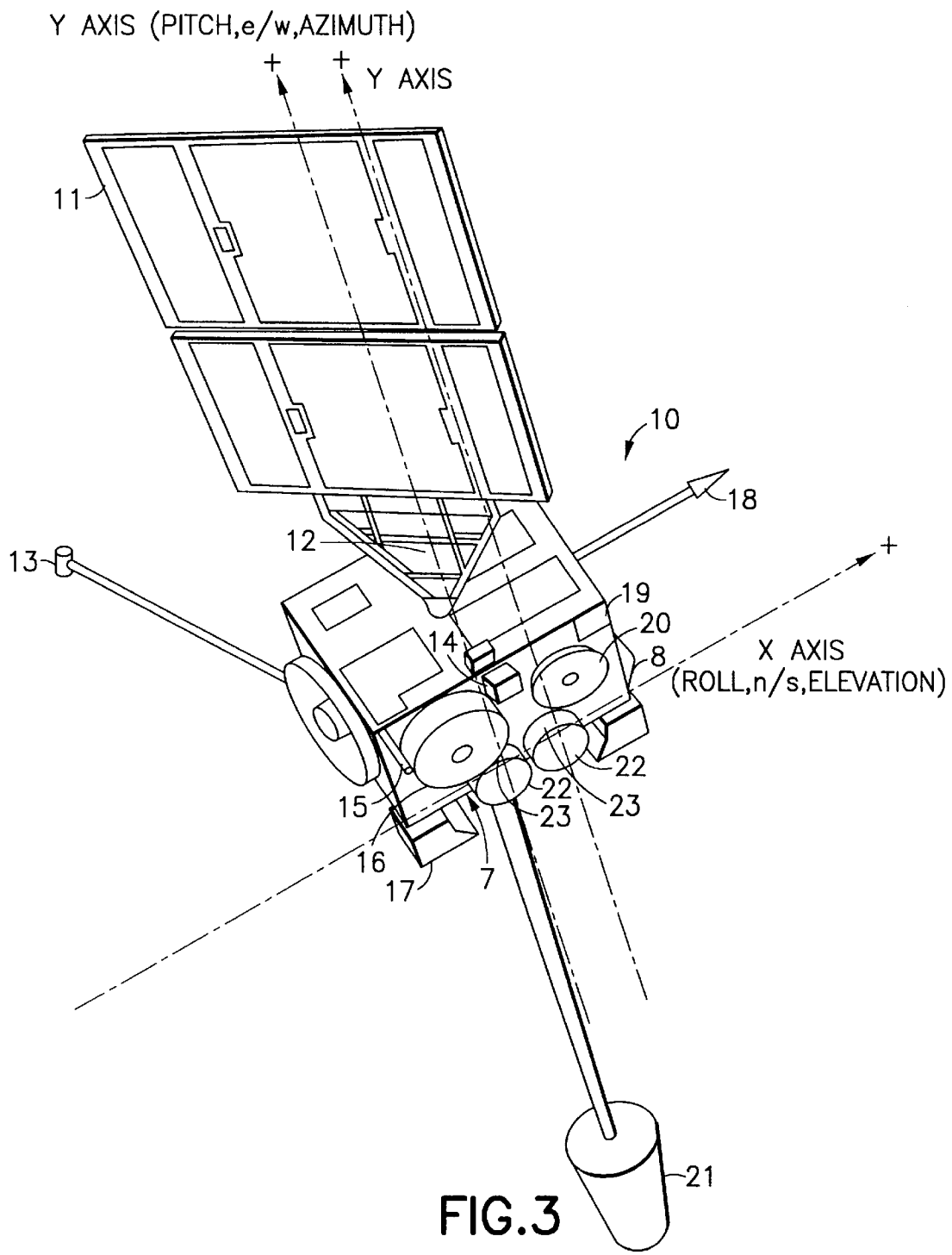
FIG. 3 is a perspective view of a satellite which can advantageously employ the present invention.

Although the present invention has utility on any type of spacecraft, it is particularly illustrated with respect to the spacecraft 10 shown in FIG. 3. The space craft 10 may be constructed with an assortment of equipment as shown in FIG. 3 including solar array 11, x-ray sensor 12, magnetometer 13, S-band transmit antenna 14, search and rescue antenna 15, UHF antenna 16, telemetry and command antenna 18, earth sensors 19, S-band receive antenna 20, solar sail 21, and two cameras 7 and 8. Cameras 7 and 8 typically include a cooler 17, aperture 22, and mirror 23.

The mirror 23 is mounted on a two-axis gimbal which selectively positions the mirror 23 with respect to orthogonal x and y axes. The x axis can also be referred to as the roll, north/south, or elevation axis. The y axis for mirror 23 can also be referred to as the pitch, east/west, or azimuth axis.

The two-axis gimbaled scanning mirror 23 provides the line of sight of the camera 23 which sweeps a path on the earth, providing data of the viewed scene. Position and size of the area scanned are controlled by ground control computer 1. Position data is obtained by periodically slewing mirror 23 to space and to an internal blackbody target during periods when the imaging system 4 is not generating images.

The details of a system of this type are described in U.S. Pat. Nos. 4,688,091 and 4,688,092, the disclosures of which are incorporated herein by reference.

Predetermined data relative to the target of the imaging system 4 is supplied by ground control computer 1. Actual position data is periodically updated based on data transmitted from the camera 23 of the space craft 10. The transmitted data includes visual star and earth position data which is used to estimate the position, i.e. attitude and orbit of the space craft, over a particular period. The estimated calculation is accomplished by using modeling algorithms described in the above referenced patents. These algorithms take into consideration the position of the space craft in response to repeatable disturbances. The estimated data is transmitted from ground control computer 1 to the satellite control computer 2 on board the space craft 10 which calculates a mirror adjustment signal to correct image registration errors indicated by the estimated data.

Figure 1:
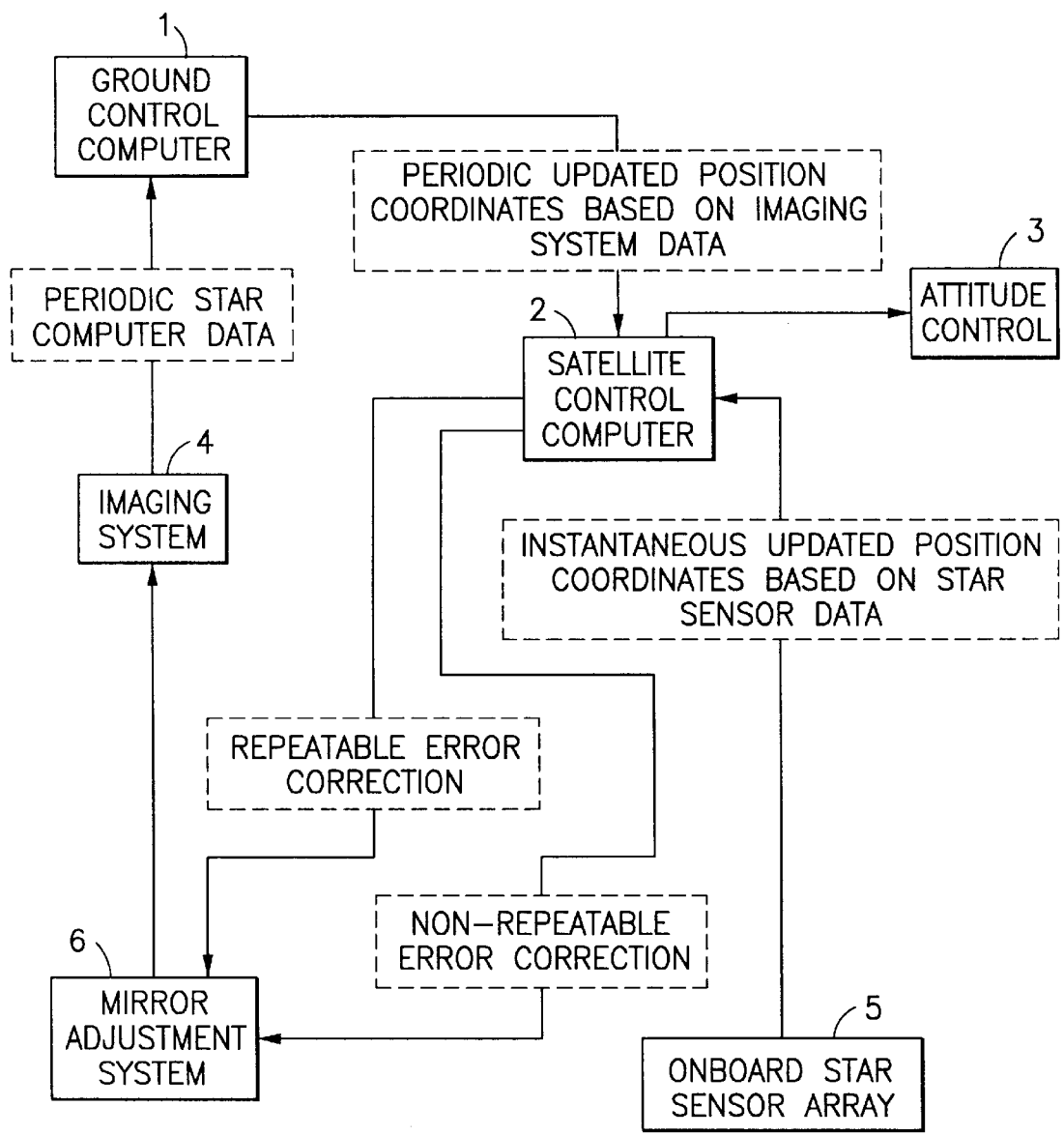
FIG. 1 is a block diagram of the system of this invention.

The onboard control system of this invention, as illustrated schematically in FIG. 1, includes the control computer 1 which directs activation of actuators in attitude control 3. Image system 4, which is essentially comprised of cameras 7 and 8 and the associated equipment described above, includes an adjustment mechanism 6. The adjustment mechanism 6 will generally consist of servo motors actuated by electronic signal from computer 2 to move the mirror 23 on its gimbal mount about its axis x and y. Onboard star sensor array 5 comprises a series of CCD (Charge Coupled Device) sensors that continuously track the position of various stars and generate signals relative thereto. The control computer 2 compares the sensed data with predetermined position information in a star catalog and calculates the current attitude position coordinates of the space craft. These coordinates can be summed with the estimated data and further adjustment can be initiated by the mirror adjustment system 6 if required.

Figure 2:
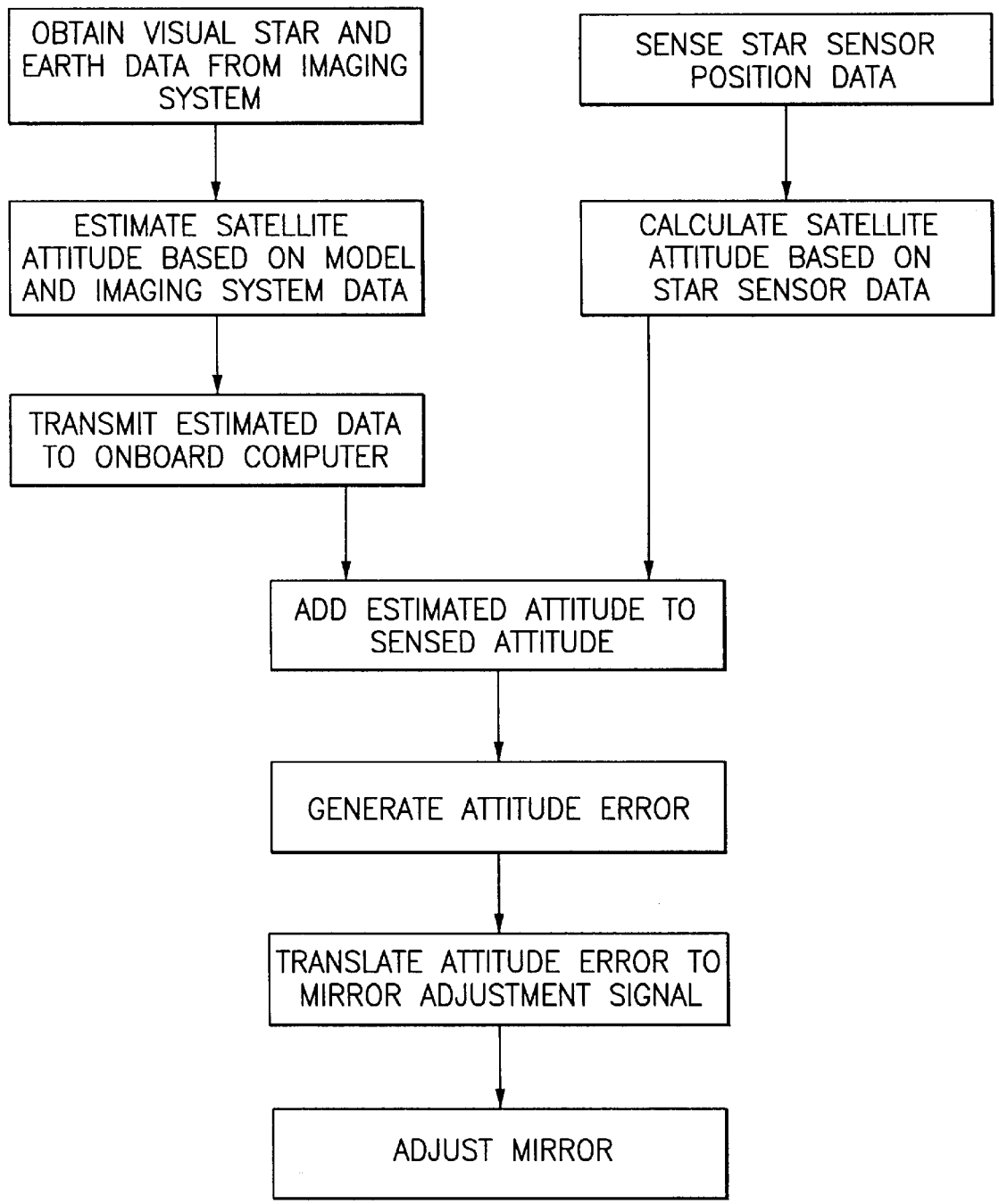
FIG. 2 is a flow diagram of the information processed in the system of this invention.

In operation, as illustrated in FIG. 2, the ground control computer 1 will periodically obtain data from imaging system 4 and periodically update the attitude position data of the space craft. Based on these data, computer 1 estimates the position of the space craft for subsequent periods. Since the collection of position data can only be accomplished during dormant periods of the image system 4 operation, the frequency of such updates is limited. In the interim, non-repeatable disturbances occur which cannot be anticipated by the models. It has been found that these disturbances can generate image registration errors which are significant. The system of this invention provides a solution to these errors.

The star sensor array 5 will provide instantaneous position data directly to the onboard control computer 2 which can be used to calculate errors occurring since the last update from ground station 1. The sensed data is summed with the estimated data and a signal is generated indicative thereof. In this manner, a further refinement of the attitude position of the space craft 10 can then be used to compensate for such errors which are caused by random disturbances. Satellite control computer 2 translates the errors calculated, based on data from the star sensors 5 into motion adjustments for the mirror system 6. In this manner an accumulation of image registration errors are avoided.

We claim:

1. A control system for maintaining the line of sight of a satellite based image generating system in registration with its mission target comprising:

a ground station control computer including means to periodically obtain satellite position data from the image generating system and estimate updated satellite attitude data therefrom;

an image registration control system contained onboard the satellite, said image registration control system further comprising:

a satellite control computer including means to receive position data from several sources, calculate the difference between said received data and predetermined data and generate an adjustment signal;

an imaging system including a camera having a line of sight, a mirror designed to control the line of sight of said camera, and means to adjust the line of sight of said camera in response to said adjustment signal; and a star sensor array including means to instantaneously sense position data of certain stars relative to the position of the satellite, the operation of said star sensing array being independent of the imaging system, and wherein the sensed data is supplied to the satellite control computer to enable said computer to calculate an adjustment signal based on the summation of said estimated data and said sensed data.

2. In a satellite having an imaging system, including a mirror and an adjustment means therefore, and further including a control system therefore, said control system including a ground station computer and a satellite computer, a method of correcting the registration of the image with a target comprising the steps of:

obtaining star and earth position data from the imaging system and transmitting said data to the ground station computer;

estimating the position of the satellite over a subsequent period based on said imaging system data and transmitting said data to the satellite computer;

sensing star position data onboard the satellite independently of the imaging system and supplying said data to the satellite computer;

calculating the position of the satellite based on said sensed data;

summing said estimated position with said sensed position and generating a signal indicative of the difference therein;

translating said difference into a mirror adjustment signal; and adjusting the mirror adjustment means in response to the mirror adjustment signal.

* * * * *